Figure 1:
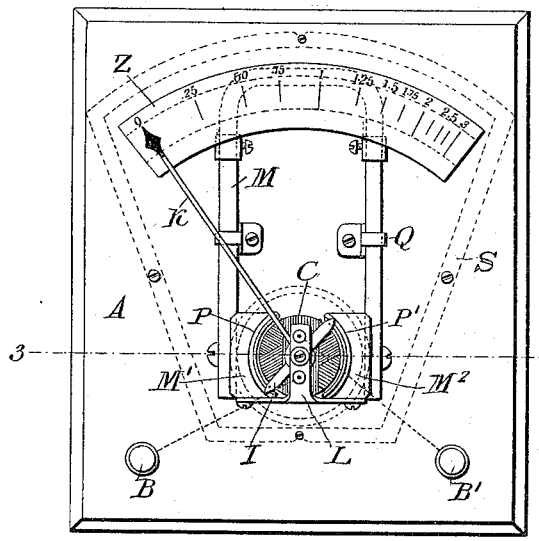

No. 634,965. Patented Oct. 17, 1899.
E. THOMSON.
ELECTRICAL MEASURING INSTRUMENT.
(Application filed Dec. 31, 1897.)

(No Model.)

Witnesses.
Benjamin B. Hull
Albert Popkins

Inventor.
Elihu Thomson
by Albert G. Davis
Atty.

THE NORRIS PETERS CO., PHOTO-LITHO., WASHINGTON, D. C.

UNITED STATES PATENT OFFICE.

ELIHU THOMSON, OF SWAMPSCOTT, MASSACHUSETTS, ASSIGNOR TO THE GENERAL ELECTRIC COMPANY, OF NEW YORK.

ELECTRICAL MEASURING INSTRUMENT.

SPECIFICATION forming part of Letters Patent No. 634,965, dated October 17, 1899.

Application filed December 31, 1897. Serial No. 664,980. (No model.)

*To all whom it may concern:*

Be it known that I, ELIHU THOMSON, a citizen of the United States, residing at Swampscott, county of Essex, State of Massachusetts, have invented certain new and useful Improvements in Electrical Measuring Instruments, of which the following is a specification.

In electrical instruments indicating volt and ampere meters, for example, the mechanism is arranged in such manner that current flowing through one or more of the parts will deflect an indicator over a graduated scale. The movement of the indicator has heretofore been opposed in some instances by a spring and in others by a weight. In a form of commercial instrument commonly used a permanent field-magnet is employed, and within the field of the magnet mounted on jewel-bearings is a swinging coil of wire which is traversed by current from the circuit to be measured. Electrical communication with the movable coil has heretofore usually been established through coiled springs, which are connected to the shaft of the coil and some stationary part of the instrument and are adapted to bring the coil and indicator back to zero position when no current is flowing in the coil. This arrangement is not entirely satisfactory owing to changes in the strength of the magnet or magnets and the liability of the parts being damaged, thus changing the zero position of the instrument and also the amount of deflection for a given current or voltage. The greatest difficulty is occasioned by variation in the strength of the magnets. Such variations may be caused by heavy currents passing near the instrument, which set up stray fields influencing the magnets. The magnetism also slowly decreases as the magnets become aged. Such variations, whatever their cause, introduce error in the reading of the instrument in direct proportion to the change of strength in the magnets. Another type of instrument has been devised in which a field-magnet is employed to deflect the moving-coil system and a separate magnet, either permanent or electro, for opposing this movement and returning the moving system to zero. This type of instrument, however, is not satisfactory, because since the moving and return systems are acted upon by different field-magnets a change in one system, due to a change of field strength, does not produce a corresponding change in the other.

To overcome the objections pointed out, to render the instrument more accurate, and to simplify its construction, I propose to employ a moving coil through which the whole or a portion of the current to be measured passes and mount this coil within the influence of a magnetic field produced either by a permanent or electro magnet. To return the moving-coil system to zero, or, in other words, to furnish the restoring torque of the instrument, I employ what I term a "magnetic return-strip" and secure it in place in such manner that it is acted upon by the same field-magnet that produces a deflection of the moving-coil system. The relation between the coil system and the return-strip is such that the needle of the instrument is brought to rest at different points corresponding to different values of the current to be measured. In other words, the force exerted by the moving coil opposes that of the magnetic return-strip. The moving system sets itself at a point where these forces balance, and the index or needle indicates the degree of deflection and the amount of current or the voltage across the terminals of the instrument.

In the accompanying drawings is shown an embodiment of my invention, in which—

Figure 2:
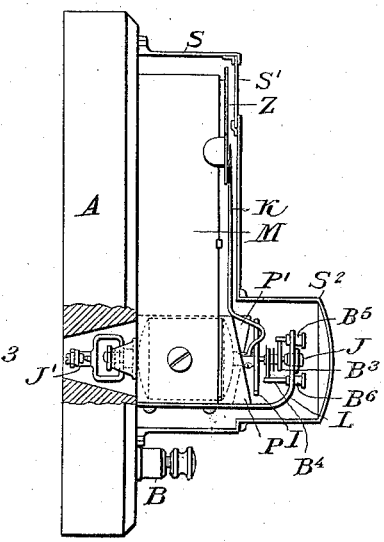
Figure 3:
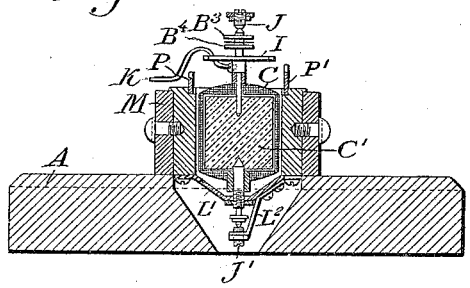

Figure 1 is a plan view of a measuring instrument with the inclosing case shown in dotted lines. Fig. 2 is a side elevation showing the casing and a portion of the base in section, and Fig. 3 is a section on line 3 3 of Fig. 1.

The base A is made of insulating material, and secured thereto by clamps Q is a permanent horseshoe-magnet M, (or, if desired, an electromagnet may be employed,) having detachable pole-pieces M' and M². The pole-pieces are similar in construction, each being provided with a flat side, which makes a good magnetic joint with the side of magnet M, and a curved side, which partially surrounds moving coil C. The upper sides of the pole-pieces are grooved and mounted therein are semicircular pieces of magnetic material P and P', constituting what I term "auxiliary" pole-pieces. Referring to Fig. 2 it will be seen that the ends of the pieces near the zero of the instrument are high and gradually decrease as the other end is approached, the object of which will be hereinafter described.

Mounted for oscillating movement on a shaft having adjustable jewel-bearings J and J' is an armature or moving-coil system, comprising a body C', of magnetic material, surrounded by a coil or coils C, wound and arranged in any suitable manner, the arrangement of turns of the form shown in the drawings being similar to that on the armature of a dynamo-electric machine, so that the lines of force in passing from one pole-piece to the other will be cut by the turns of the coil when the latter is turned on its axis. Mounted on the coil-shaft is a small transverse piece of magnetic material I, which I have termed a "magnetic return-strip" or "auxiliary armature." This is situated with its ends directly over, but not touching, the curved pieces P and P', which are secured to the pole-pieces, and while in the zero position is close thereto; but as the coil and strip I move away the distance gradually increases.

The tendency of any portion of a magnetic circuit to move to such a position as to cause the total magnetic reluctance of the circuit to be a minimum causes the strip I to furnish at all times the necessary restoring torque, while the deflecting torque is furnished, as usual, by the mutual action of the magnet and the suspended coil.

Extending from one pole to another is a non-magnetic bridge L', and secured to the bridge is an arm $L^2$, which supports the lower adjustable bearing J'. Connection with the moving coil is established by means of flexible connections $B^3$ and $B^4$. These are very light and, so far as possible, neither assist nor retard the movement of the coil. It is to be understood that these connections do not in any way form the equivalent of the spring return commonly employed in measuring instruments. Flexible connections $B^3$ and $B^4$ are respectively connected to insulated terminals $B^5$ and $B^6$, which in turn are connected to binding-posts B and B', located on base A.

Mounted on the coil-shaft for movement across scale Z is a needle K, arranged to indicate by its position the angular deflection of coil C. By varying the relation that the pole-pieces and magnetic return-strip bear to each other the indications on the dial may be widely varied—that is, the scale may be made so that the indications are close on the ends and open in the center, or it may be close in the center and open on the ends.

Surrounding the working parts of the instrument is a suitable case S, having a glass-covered opening S', situated over the scale, and a tubular extension $S^2$, surrounding the upper jewel-bearing. The action of my invention is as follows: Current enters coil C from binding-post B by flexible connection $B^4$, passes through the coil and out by way of flexible connection $B^3$ to binding-post B'. This causes a rotation of the coil, the amount depending upon the current passing, and the magnetic return-strip I is moved into a stronger part of the field and offers as it moves a certain opposition to the movement of the coil. Increasing the current-coil C increases the angular movement until the instrument has reached its capacity and needle K has traveled across the scale Z.

When my invention is applied to a voltmeter, coil C is made of high resistance and may be put in circuit with resistance to further limit the current. For an ammeter the moving coil may be put in shunt to a definite resistance, so that the current flowing therein will bear a definite relation to the total current, or when comparatively small currents are to be measured it may all pass through the coil.

In ordinary commercial instruments the deflecting torque is dependent upon the strength of the magnet, while the restoring torque is independent of the strength of the magnet and does not necessarily vary with any variation of the deflecting torque. The indications of the instrument are thus liable to error from two sources, first, from any change in the strength of the magnets, and, second, from any change in the strength of the restoring torque.

In my improved instrument it will be seen that springs or their equivalent—a gravity return—are entirely done away with, thus removing one common source of error, while any change in the deflecting torque due to a change in the strength of the field-magnets is balanced by a corresponding change in the restoring torque, since the deflecting torque is caused by the action of the magnet M upon the coil C, while the restoring torque is caused by the action of the same magnet M upon the needle I. The instrument thus becomes self-compensating for all changes of field strength within certain very wide limits.

It often happens that when instruments are received by the customer the needle will not return to zero. This may be caused by the pointer being bent, by a change in the spring or gravity return, causing the moving system to be slightly changed from the position it occupied while being calibrated. From the appearance of the instrument it is impossible to tell whether the fault is entirely with the pointer or with the spring or gravity return, or both. This necessitates recalibration, usually obtained by returning the instrument to the factory, causing delay and expense. With the arrangement shown if the needle does not point to zero when no current is flowing in the current-coil it shows at once that the needle is bent, as the magnetic system always returns to the same position. It will be seen that this is of great importance, for it reduces the liability of damage to the instrument to a minimum, and the indicator can readily be set to the proper zero without recalibration and with the certainty that this is all the attention the instrument requires.

What I claim as new, and desire to secure by Letters Patent of the United States, is—

1. The combination in an electric measuring instrument of a magnetic motor mechanism for giving movement to the indicator away from the zero position, and a magnetic return mechanism opposing the motor mechanism and returning the indicator to the zero or initial position, the motor and return mechanisms being subject to like changes in the strength of the energizing magnet or magnets.

2. In an electric measuring instrument the combination of a magnetic motor mechanism giving movement to the indicator away from the initial position, a return mechanism for returning the indicator to the initial position, and means whereby any increase or decrease in the strength of the motor mechanism, under the action of a given magnetic field correspondingly in like ratio increases or decreases the strength of the return mechanism.

3. In an electric measuring instrument the combination of a motor mechanism comprising an energizing-magnet and coil in inductive relation to the magnet, a return mechanism and means whereby any increase or decrease in the strength of the energizing-magnet of the motor mechanism correspondingly increases or decreases the strength of the return mechanism.

4. In an electric measuring instrument, the combination of a magnet, a moving system in the field of the magnet, and magnetic return mechanism situated in the same magnetic field for opposing the action of the moving system, and returning it to the initial position.

5. In an electric measuring instrument, the combination of a magnet, a moving system in the field of the magnet, and a piece or body of magnetic material also in the field of said magnet for returning the moving system to its zero or initial position.

6. In an electric measuring instrument, the combination of a field-magnet, a coil mounted for movement within the field of the magnet and adapted to be traversed by current from the circuit to be measured, and a piece or body of magnetic material for returning the moving system to zero, mounted on the same support as the moving coil, and within the influence of the same magnetic field, so that, as the deflecting force of the field-magnet changes, the returning force will be correspondingly changed.

7. The combination of a magnetic motor mechanism and magnetic return mechanism acted upon by the same field-magnet and so proportioned that the returning torque of the magnetic return mechanism will bring the indicator to rest throughout the range of the instrument at points corresponding with and determined by the different current values measured.

8. In an electric measuring instrument, the combination of a movable coil, field-magnet poles arranged to embrace the moving coil, a magnetic return mechanism, and polar extensions arranged to exert a changing attraction upon the magnetic return mechanism.

9. In an electric measuring instrument, the combination of a movable coil, field-magnet poles arranged to embrace the movable coil, a magnetic return mechanism and auxiliary pole-pieces deriving their flux from the main field-magnet acting upon the magnetic return mechanism.

10. The combination with a pivoted armature and a magnet, of an auxiliary armature connected to the main armature and so related thereto that the magnetic force acting upon the auxiliary armature will resist its movement and consequently the movement of the main armature from normal position, substantially as set forth.

In witness whereof I have hereunto set my hand this 29th day of December, 1897.

ELIHU THOMSON.

Witnesses:
M. L. THOMSON,
MINNIE F. SWARTHOUT.